May 8, 1951 W. BENGTSON 2,551,821
BALL CHAIN DRIVE
Filed Sept. 3, 1949
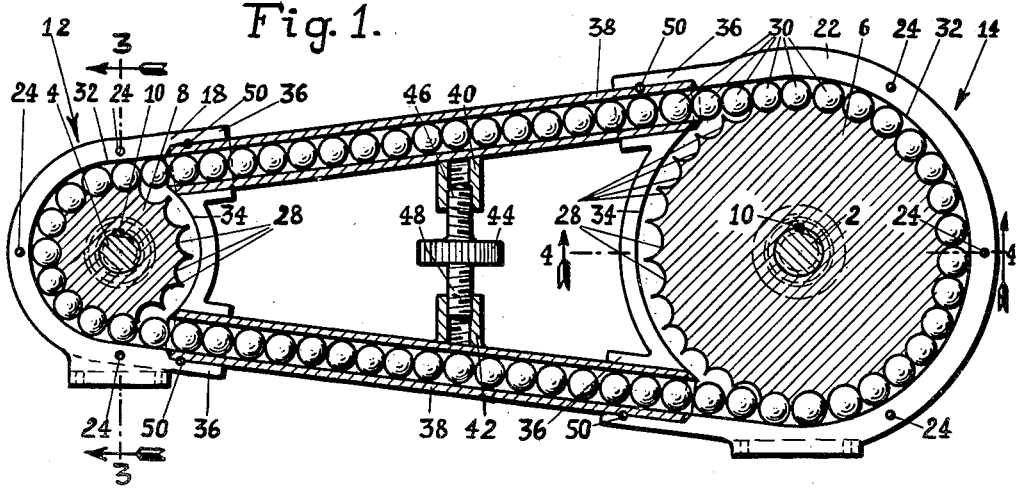
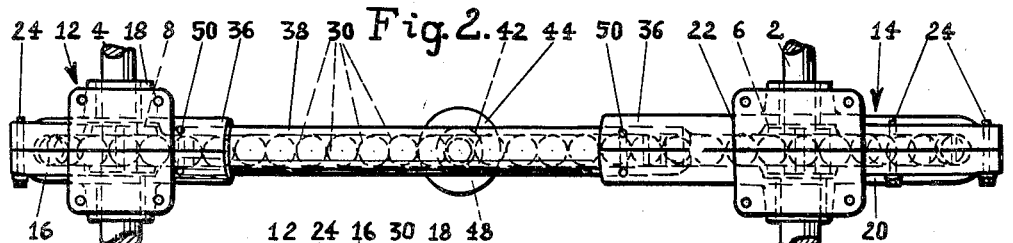
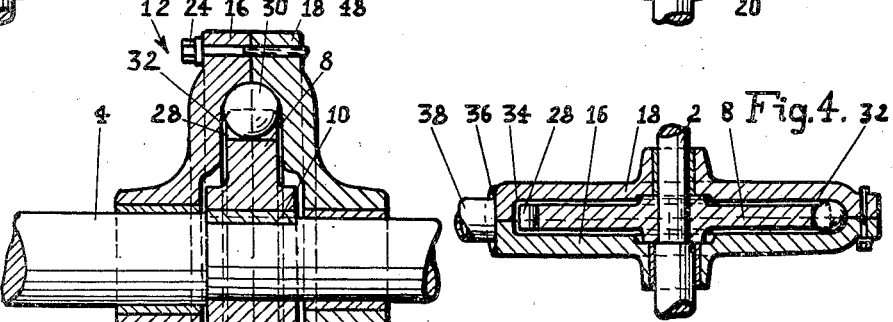
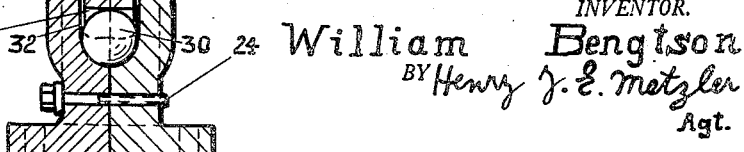
INVENTOR.
William Bengtson
BY Henry J. E. Metzler
Agt.

Patented May 8, 1951

2,551,821

UNITED STATES PATENT OFFICE 2,551,821

BALL CHAIN DRIVE

William Bengtson, Roosevelt, N. Y.

Application September 3, 1949, Serial No. 113,945

2 Claims. (Cl. 74—243)

The present invention relates to improvements in mechanical power transmission devices for transmitting power from one rotating shaft to another shaft.

One object of the present invention is the provision of a device of the character described which is an improved substitute for chain, belt, gear, hydraulic, pneumatic or electrical power transmissions, and which reduces to a minimum the friction and wear and tear of the moving parts.

Another object of the present invention is the provision of a device of the character described which has all moving parts air-tight enclosed, so that these moving parts cannot be damaged by dust, dirt, humidity, and oxidation, but can move in a lubricating medium.

A further object of the present invention is the provision of a device of the character described which is simple in construction, but sturdy, durable, noiseless in operation, and well adapted to withstand the rough usage to which devices of this type usually are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing a preferred form of the invention has been shown.

In said drawings:

Figure 1 is a vertical sectional view of a preferred embodiment of my invention;

Figure 2 is a bottom plan view of the same;

Figure 3 is an enlarged sectional view on the line 3—3 of Figure 1; and,

Figure 4 is a sectional, fractional view on the line 4—4 of Figure 1.

Similar reference characters refer to similar parts throughout the several views.

The embodiment shown in the drawing can be used, for instance, as driving mechanism of bicycles, tricycles, and the like, in which the motion of a pedal shaft 2 is transmitted to the shaft 4 of a driving wheel (not shown), although it can be used also for many other purposes. Wheels 6 and 8 are secured to the shafts 2 and 4 respectively by means of keys 10 or by any other suitable means. The shafts 2 and 4 are rotatably extended through housings 12 and 14, each of which preferably consists of a pair of shell members 16 and 18, and 20 and 22 respectively which are secured to one another by means of screws 24 or the like.

The wheels 6 and 8, which are similar to sprocket wheels, have on their peripheries semi-circular indentations 28, one adjacent the other, which are adapted for receiving balls 30 of hardened steel or of any other suitable material. Each housing 12 and 14 has a circular inner rim, and each rim consists of a first section 32 and a second section 34. The rim sections 32 are semi-circular in cross-section. Each first rim section 32 is so dimensioned as to allow the passing therethrough of balls placed into the peripheral indentations of one of said wheels while the second inner rim section is rectangular in cross-section and so dimensioned as to allow the passing therethrough of a portion of the empty wheel only.

Stud portions 36 extend outwardly from the housings 12 and 14 and are provided with bores which are tangent to the curved rim sections 32. The end portions of tubes 38, which connect the housings 12 and 14 to each other, are extended into the bores of the stud portions 36. The tubes 38, which preferably are made of thin-walled steel tubing or of any other suitable resilient material and whose inner diameter is large enough for allowing the balls 30 to pass therethrough, terminate approximately at the respective junctures of the inner rim sections 32 with the rim sections 34. The tubes 38 and the inner rim sections 32 are filled with balls 30, one of which is adjacent the other, so that through the medium of said balls the wheel 8 can be rotated by rotating the wheel 6.

I prefer to interpose between the tubes 38, intermediate their ends, any suitable means for altering the distance between the center portions of said tubes by bending them slightly either inwardly or outwardly, so that the space for the balls 30 can be adjusted in accordance with what little wear there may occur on the balls, or in accordance with extreme temperatures to which the device might be subjected. I prefer to carry out this feature of my invention in the manner shown in Figures 1 and 2, where it will be seen that tubular, internally in opposite directions threaded, members 40 and 42 are secured to the tubes 38 by welding or the like; a bolt having a central disk portion 44, whose periphery is knurled, has a left-hand thread at its portion 46 and a right-hand thread at its portion 48; and the threaded portions 46 and 48 engage the respective internal threads of the members 40 and 42, so that by turning said bolt the tubes 38 will be bent and the center portions of the tubes 38 will be forced apart or pulled together. The end portions of the tubes 38 preferably are secured within the stud portions 36 by means of cross-pins 50 or the like.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

1. A ball chain drive comprising a pair of wheels having on their peripheries indentations each of which is adapted for receiving a ball, a pair of shells forming a housing encompassing each of said wheels and having circular inner rim sections, a pair of tubes connecting said housings to each other and terminating thereinto, a shaft being rotatably extended through each housing and having secured thereto one of said wheels, and a plurality of balls one adjacent the other being slidable in said tubes and in a portion of said inner rim sections, that portion of each inner rim section which is located between the terminals of said tubes being reduced in diameter so as to permit the passing therethrough of an empty wheel section only.

2. A device of the character described comprising a pair of wheels having on their peripheries semi-circular indentations one adjacent the other, two pairs of shells forming housings encompassing each wheel and having circular inner rim sections, a pair of resilient tubes connecting said housings to each other and terminating thereinto at places in which they are in tangential alignment with said inner rim sections, means for altering the distance between said tubes being secured to the latter intermediate their ends, a shaft to which one of said wheels is secured being rotatably extended through each housing, and a plurality of balls one adjacent the other being slidable in said tubes and in a portion of the inner rim sections of said housings, the inner rim section of each housing having between the terminals of said tubes a reduced portion which is right-angular in cross-section and so dimensioned as to permit the passing therethrough of said wheel, while the rest of each inner rim section is semi-circular in cross-section and so dimensioned as to permit the passing therethrough of the wheel and of said balls.

WILLIAM BENGTSON.

REFERENCES CITED

The following references are of record in the file of this patent:

UNITED STATES PATENTS

| Number | Name | Date |
| --- | --- | --- |
| 576,102 | Flindall | Feb. 2, 1897 |
| 1,483,114 | Root | Feb. 12, 1924 |